Patented Oct. 31, 1939

2,178,018

UNITED STATES PATENT OFFICE 2,178,018

ORNAMENTAL COATING AND MATERIAL THEREFOR AND METHOD OF MAKING SAME

Joseph Francis Hofmann, Detroit, Mich., assignor to Acme White Lead & Color Works, Detroit, Mich., a corporation of Michigan No Drawing. Application June 15, 1935, Serial No. 26,864

1 Claim. (Cl. 134—76)

My invention relates to a novel ornamental coating finish for automobiles and various other manufactured products. In my prior application Serial No. 753,063, filed November 14, 1934, I disclosed a novel type of finish in which the coating material, instead of flowing out to a homogeneous even film, forms an uneven surface with the pigment material segregated into minute hills of very irregular shape, arrangement and size.

According to the present invention, I produce a perfectly uniform, smooth, high lustre finish, which, in appearance, is iridescent and simulates a gunmetal or burnished metal finish having a coating of clear varnish thereon.

Finishes similar, in appearance, to those which I am able to obtain by my present invention, have been heretofore obtained by means of pigmented lacquers having a bronze powder incorporated therein, but the use of such lacquer finishes has been restricted because they are relatively expensive on account of the number of coats required and the time and labor necessary for rubbing the finish to obtain the desired lustre.

The trend in finishes, in recent years, and particularly in the automobile industry, has been toward the synthetic resin varnish finishes, in place of lacquer, because of the lesser number of coats required, and because they dry with a high lustre and do not require rubbing. However, attempts that have heretofore been made, to incorporate bronze powders in these synthetic varnishes, have not produced satisfactory results because of the tendency of the powders to float to the outer surface of the coat, or "leaf", and not only destroy the natural lustre of the varnish but produce a "dead" metallic appearance resembling that of ordinary aluminum paint. By my invention I have been able to incorporate bronze powder in synthetic resin varnishes, and produce finishes, as above referred to, which, in appearance, have all of the advantages of the above mentioned lacquer finishes and, in addition, have the advantage of the lower cost of the synthetic resin varnish finishes. By the practice of my invention I am able to produce a finish in which the bronze powder settles to the under surface of the coat and leaves the outer surface uniformly smooth, transparent, and with a high lustre and an unpigmented appearance such as would be produced by the application of a clear varnish to a gunmetal or burnished surface, so that the appearance of the finish might be described as "gunmetal", or "oxidized metal", or "burnished metal." The effect produced might be described as an undertone of metal with a clear unpigmented surface somewhat similar to the surface effect produced by heat and chemical treatment on a highly polished gun barrel. The finish is particularly striking when viewed in strong sunlight.

In the usual method of manufacturing aluminum and other bronze powders, it has been customary to pulverize them in a protective material, such as stearic acid, which reduces the fire hazard, promotes "leafing", and also preserves the brilliance of the material by giving to each particle a protective coating. When these bronze powders are mixed with a synthetic resin varnish, in the ordinary way, the powder floats to the outer surface of the coat, when the material is applied, and produces what is commonly known as the "leafing" effect, which is the effect produced by the application of ordinary aluminum paint. However, I have discovered that by a thorough grinding of the bronze powder in a suitable highly volatile solvent or in a mixture of the solvent with the synthetic resin varnish, the behavior, when the material is applied, is entirely changed and the leafing tendency is eliminated and the powder settles to the under surface of the coat and the outer surface is left uniformly smooth, transparent, and with a high lustre. In order to obtain these results, the bronze powder is tumbled or ground in the solvent or the vehicle for a period of several hours, and I have found that the grinding may be done in a pebble mill with entirely satisfactory results.

After the material has been applied to a surface, the wet film may be either air dried or baked in a wide range of temperatures. For instance, baking for one hour at a temperature of 250° F. or for one and one-half hours at 200° F. gives a most satisfactory film. The material may be applied by means of a spray gun, using the ordinary air pressures of from 50# to 80# in the gun, and a pressure of about 10# in the material supply tank.

The following is a typical formula for a material according to my invention, for producing a gunmetal finish:

| | Pounds |
|---|---|
| SB505 | 80 |
| Aluminum paste | 50 |
| SV22 | 160 |
| SV15 | 160 |
| Hydrogenated naphtha of low boiling point | 240 |

In the above formula, the material SB505 is of the following composition:

| | Pounds |
|---|---|
| Carbon black | 28 |
| Synthetic resin varnish, made either from alkyd resins or phenol formaldehyde resins | 445 |
| High flash naphtha | 23 |
| Antiskinning material such as guaiacol | 14 |

The aluminum paste in the above formula is made by mixing 80# of aluminum "lining", which is an extremely fine aluminum powder mixed in mineral spirits, with 320# synthetic resin varnish.

The material SV22 is made by the following formula:

| | Per cent |
|---|---|
| Alkyd resin | 50 |
| Toluol | 10 |
| Naphtha | 25 |
| Isopropylacetate | 10 |
| Butanol | 5 |

The material SV15 is made by the following formula:

| | Per cent |
|---|---|
| Alkyd resin | 50 |
| Toluol | 10 |
| Naphtha | 25 |
| Isopropylacetate | 15 |

The various materials of the main formula are introduced into a pebble mill and ground in the usual way therein for several hours, or until the product, on application to a surface, exhibits the non-leafing effect by virtue of the fact that the aluminum settles to the under surface of the coat.

Instead of initially introducing all of the materials of the main formula into a pebble mill, the aluminum paste and the solvents SV15 and SV22 may be introduced into the pebble mill, and ground therein for several hours, and then the color material SB505 introduced and the grinding continued until the composition is in a homogeneous condition with a complete dispersion of the aluminum.

Having thus described my invention, I claim:

The method of making a non-leafing bronze powder coating composition which consists in grinding bronze powder in a highly volatile solvent until the powder is reduced to a state of extreme fineness, and then mixing the same with a synthetic resin varnish until the bronze powder is completely and uniformly dispersed in the mixture of varnish and solvent.

JOSEPH FRANCIS HOFMANN.